(12) United States Patent
Elliott, II

(10) Patent No.: US 9,490,626 B2
(45) Date of Patent: Nov. 8, 2016

(54) METHODS FOR ANTI-ISLANDING IN DISTRIBUTED-SOURCE ELECTRICAL POWER GENERATION AND DISTRIBUTION SYSTEMS AND ELECTRICAL SYSTEMS AND APPARATUS USING SAME

(71) Applicant: AEG Power Solutions BV, Zwanenburg (NL)

(72) Inventor: William Dewey Elliott, II, Parker, TX (US)

(73) Assignee: AEG Power Solutions BV, Zwanenburg (NL)

( * ) Notice: Subject to any disclaimer, the term of this patent is extended or adjusted under 35 U.S.C. 154(b) by 330 days.

(21) Appl. No.: 14/156,911

(22) Filed: Jan. 16, 2014

(65) Prior Publication Data

US 2014/0225457 A1    Aug. 14, 2014

Related U.S. Application Data

(60) Provisional application No. 61/764,700, filed on Feb. 14, 2013.

(51) Int. Cl.
| | |
|---|---|
| *H02J 5/00* | (2016.01) |
| *H02H 3/48* | (2006.01) |
| *H02J 3/44* | (2006.01) |
| *H02J 3/38* | (2006.01) |

(52) U.S. Cl.
CPC ...... *H02H 3/48* (2013.01); *H02J 3/38* (2013.01); *H02J 3/44* (2013.01); *H02J 2003/388* (2013.01); *Y10T 307/826* (2015.04)

(58) Field of Classification Search
CPC ............... H02J 5/00; H02J 3/40; H02J 3/44; H02J 2003/388
USPC ................... 307/125, 130, 131, 141, 151
See application file for complete search history.

(56) References Cited

U.S. PATENT DOCUMENTS

| | | | |
|---|---|---|---|
| 5,225,712 A | 7/1993 | Erdman | |
| 7,193,872 B2 * | 3/2007 | Siri | ............... H02M 3/33592 363/95 |

(Continued)

OTHER PUBLICATIONS

Copending, co-owned U.S. Appl. No. 14/141,715, filed Dec. 27, 2013.

(Continued)

*Primary Examiner* — Adi Amrany
(74) *Attorney, Agent, or Firm* — Cohen & Hildebrand, PLLC

(57) ABSTRACT

A method of detecting an interruption of grid electrical power at an output of an inverter power train coupled to an electrical grid includes generating a reference waveform representing a power train output current waveform with a current control loop. An out-of-phase control signal is generated, which is synchronized and out-of-phase with a grid voltage waveform, with a voltage control loop coupled to the output of the inverter power train, the voltage control loop having a gain proportional to an inverter power train load impedance. The reference waveform and the out-of-phase control signal are combined to generate a power train control signal for producing a small phase difference between the inverter power train output current waveform and the grid voltage waveform. The inverter power train output is monitored for a change and the inverter power train is turned off in response to a change in the inverter power train output caused by an increase in inverter power train load impedance resulting from an interruption in the grid electrical power.

22 Claims, 4 Drawing Sheets

(56) References Cited

U.S. PATENT DOCUMENTS

| | | | |
|---|---|---|---|
| 7,465,872 B1* | 12/2008 | de Rooij | H02J 3/01 |
| | | | 136/243 |
| 7,760,526 B2 | 7/2010 | Marroni et al. | |
| 8,406,022 B2* | 3/2013 | Kim | H02J 3/383 |
| | | | 363/95 |
| 2005/0254191 A1* | 11/2005 | Bashaw | H02J 3/383 |
| | | | 361/62 |
| 2006/0004531 A1* | 1/2006 | Ye | G01R 19/2513 |
| | | | 702/60 |
| 2010/0208501 A1 | 8/2010 | Matan et al. | |
| 2011/0187200 A1* | 8/2011 | Yin | H02J 3/383 |
| | | | 307/86 |
| 2011/0255307 A1 | 10/2011 | Kim et al. | |
| 2012/0087159 A1 | 4/2012 | Chapman | |
| 2013/0058139 A1* | 3/2013 | Bae | H02H 3/38 |
| | | | 363/55 |
| 2013/0155736 A1 | 6/2013 | Ilic et al. | |
| 2014/0152331 A1* | 6/2014 | Wagoner | G01R 27/16 |
| | | | 324/705 |
| 2014/0192567 A1* | 7/2014 | Balocco | H02M 7/04 |
| | | | 363/40 |

OTHER PUBLICATIONS

Analog Devices Application Note AN21990-11, Jan. 2002 (14 pages).

Keliang Zhou & Danwei Wang, "Relationship Between Space Vector Modulation and Three Phase Carrier Based PWM: A Comprehensive Analysis", IEEE, vol. 49, No. 1, pp. 186-196 (Feb. 2002).

R.H. Park, "Two-Reaction Theory of Synchronous Machines Generalized Method of Analysis", AIEE (1929), pp. 81-95.

International Search Report of counterpart PCT International Application (PCT/IB2014/000065) (2 pages)(Sep. 3, 2014).

Ciobotaru et al., "Accurate and Less Distributing Active Antiislanding Method Based on PLL for Grid-Connected Converters", IEEE Transactions on Power Electronics, vol. 25, No. 6, Jun. 30, 2010, pp. 1576-1584.

* cited by examiner

METHODS FOR ANTI-ISLANDING IN DISTRIBUTED-SOURCE ELECTRICAL POWER GENERATION AND DISTRIBUTION SYSTEMS AND ELECTRICAL SYSTEMS AND APPARATUS USING SAME

CROSS-REFERENCE TO RELATED APPLICATION

The present applications claims the benefit of U.S. Provisional Patent Application Ser. No. 61/764,700, filed Feb. 14, 2013.

The following co-pending and co-assigned application contains related information and is hereby incorporated by reference for all purposes:

U.S. patent application Ser. No. 14/141,175, filed Dec. 27, 2013, for Methods for Controlling Electrical Inverters and Electrical Inverters Using The Same.

FIELD OF INVENTION

The present invention relates in general to electrical power generation and distribution systems, and in particular to methods for anti-islanding in distributed-source electrical power generation and distribution systems and electrical systems and apparatus using the same.

BACKGROUND OF INVENTION

In a traditional electrical utility grid model, the voltage and associated current are provided by large scale utility power plants running from expendable energy sources, such as coal, nuclear, natural gas and oil. However, modern electrical utility grids, in addition to receiving electrical power from traditional energy sources, can now also receive electrical power from multiple alternative and/or renewable energy sources, which may be directly or indirectly connected to the electrical grid. However, notwithstanding the particular types of energy sources (e.g., traditional, alternative, or renewable) providing the electrical power, all of those sources are normally coupled to the associated electrical grid through a grid connected unit, which converts and/or processes the generated electrical energy being sourced to the grid.

FIG. 1A depicts a conceptual power distribution system including a number of common electrical energy sources, which are either directly or indirectly connected to a conventional electrical grid 100 through a corresponding grid connected united. (In actual practice, the number and types of electrical energy sources connected to a given electrical grid can differ significantly. In addition, while the various energy sources shown in FIG. 1A are represented as consolidated entities, in actual practice, any of these energy sources could comprise multiple subsystems, which are physically and/or functionally distributed over a particular geographical area.)

Electrical grid 100 is controlled by a standard utility-scale control system 120 and is connected to a solar power plant 101, for example, through a central inverter, container solution, monitoring and supervision system, or plant controller. An electrical power to gaseous hydrogen ($H_2$) generation plant 102 is also shown, which could connect to electrical grid 100 through an electrolysis rectifier. The system shown in FIG. 1A also includes a battery electrical storage system (BESS)/grid services system 103, which could connect to electrical grid 100 through a bidirectional inverter.

In the conceptual power distribution system of FIG. 1A, a wind park 104 connects to electrical grid 100, for example, through an uninterrupted power supply (UPS) system or an AC/DC converter. A local micro-grid 105 connects to electrical grid 100 through a subsystem such as a plant-scale intelligent power management system. Conventional electrical power plant 106 connects to electrical grid 100 through a UPS system, rectifier, inverter, or similar subsystem.

Electrical grid 100 is also shown connected to an office complex and data center 107, a set of residential users 108, an industrial complex 109, and an electromobility station 110 (e.g., electric filling station). Office and data center 107 could, for example, connect to electrical grid 100 through a UPS/DC infrastructure, while residential users 108 could connect to electrical grid 100 through a string inverter, intelligent substation, stabilizer, or the like. Industrial complex 109 connects to electrical grid 100, for example, through a power controller. A telecommunications hybrid power system 111, which could be either off-grid or grid-connected, could include a hybrid power generation system that integrates diesel, solar, and wind power generation capabilities.

Depending on the given observation point within the utility grid, a given electrical power source may provide electrical power in a range of low to high voltages, as a direct current (DC) or alternating current (AC), and/or in single or multiple phases. However, most parts of a typical electrical utility grid, as well as most conventional commercial/industrial systems, normally use three-phase alternating current (AC) power for power transmission and delivery. Therefore, some interface system or process is required for converting the corresponding forms of energy being generated by the various energy sources into a form and voltage compatible with the utility grid.

One such interface system is an electrical inverter that transforms the energy generated by a given energy source into sinusoidal AC power with a voltage compatible with the utility grid. For example, an inverter converts (or processes) energy from sources such as solar panels, wind turbines, steam turbines, DC battery plants, and the like, into a sinusoidal AC form and voltage compatible and consistent with the general AC electrical utility grid.

FIG. 1B is a high-level block diagram of a representative two-stage inverter unit 112 including a first stage 113 and a second (inverter power) stage 114. In this configuration, when the input is a DC signal, first stage 113 is a DC-DC converter and second stage 114 is a DC-AC converter. When the input is an AC signal, first stage 113 is a rectifier or an AC-DC converter and second stage 114 is a DC-AC converter. Galvanic isolation can be implemented in either of the first or second stages.

In the system shown in FIG. 1B, inverter power stage 114 comprises several blocks, including an inverter power train and a control scheme or function. Generally, the inverter power train switches power to transfer energy from its input to the inverter unit 112 output. The inverter power train can include one control input for duty cycle (e.g., pulse width modulation or PWM) control of the inverter power train or several control inputs for controlling three-phase AC outputs, depending on the power train complexity. State Space Vector control is one technique known in the art for computing the Duty Cycle (DTC) used to control an inverter power train, as might be used inverter power stage 114 of FIG. 1B. Space Vector Modulation control is described in numerous papers, such as Analog Devices Application Note AN21990-11 or the IEEE paper by Keliang Zhou and Danwei Wang entitled "*Relationship Between Space Vector Modulation and Three Phase Carrier Based PWM: A Comprehensive Analysis.*"

Assuming that the inverter unit output is connected to a pure resistive load, the inverter output voltage waveform is a sine wave. However, if the load is not a purely resistive, and hence the current and voltage are not in phase, the power must be delivered to the load as active and reactive parts. To process the Reactive Power (RP), the Active Power (AP) delivered to the load must be decreased and the inverter unit becomes less efficient. One solution to overcome the loss of the maximum AP available from the inverter unit, when RP must be processed, is to oversize the inverter unit.

In a Grid Connected Inverter (GCI), the GCI output voltage is essentially locked to the grid voltage, since the very low impedance of the grid makes it nearly impossible for the GCI to modify the grid voltage. Consequently, the current injected or pushed into the grid by the GCI is only determined by this very low impedance. In this case, the amplitude of the inverter output current is controlled with a PLL loop that increases or decreases the inverter output voltage and adjusts the phase shift of the current.

In a Grid Connected Inverter (GCI), the voltage magnitude is given by the grid. The impedance of the grid is so low that it is nearly impossible to modify the grid voltage magnitude. Consequently, the power delivered to the grid is controlled by injecting or pushing current into the grid with a current control loop.

A potentially dangerous condition known as islanding occurs on an electrical utility grid when the primary source supplying power to the grid or a branch of the grid is interrupted, but nevertheless one or more secondary sources continue to serve power to a section of the grid isolated from the primary source (an "island"). For example, a main power production facility may go offline or a failure may occur in the power transmission network, but wind turbines and solar panels may still continue to output power to a local branch of the power grid, so long as wind and sunlight are available.

The continued service of power to islands can create significant problems, including personnel hazards during grid maintenance and fault repair on lines that should otherwise not be energized, difficulties in re-energizing lines when the main power source is once again available, and difficulties in matching the secondary source to the grid on main power source restoration.

In view of the potentially serious problems that islanding can create, the operators of distributed power systems (e.g., electric utilities) normally require that some kind device or system be embedded in each distributed power source connected to the grid, which automatically disconnects that power source from the grid in the event of a main power disruption. This ability of the secondary ("island") sources to automatically disconnect from the grid during main power disruption is commonly referred to as an "anti-islanding" function or feature. The anti-island function may be implemented, for example, in the GCI interfacing the secondary source with the grid.

In the case of a GCI interfacing a power grid with a solar, wind, or other electrical power source that continues to generate power after disruption of the main power source, it is mandatory to have an anti-islanding function to prevent energy flow onto the grid to avoid the problems discussed above.

SUMMARY OF INVENTION

According to a preferred embodiment of the principles of the present invention, a method is disclosed for detecting an interruption of grid electrical power at an output of an electrical inverter having an inverter power train coupled to an electrical grid. The method includes generating a reference waveform representing an output current waveform with a current control loop. An out-of-phase control signal is generated, which is synchronized and out-of-phase with a grid voltage waveform, using a voltage control loop coupled to the output of the electrical inverter. The voltage control loop has a gain proportional to an inverter load impedance. The reference waveform and the out-of-phase control signal are combined to generate a power train control signal for producing a small phase difference between the output current waveform and the grid voltage waveform. The inverter output is monitored and the inverter power train is turned off in response to a change in the inverter output caused by an increase in inverter load impedance resulting from an interruption in the grid electrical power.

Advantageously, the anti-islanding functions realized by the embodiments of the principles of the present invention allow for fast detection of an interruption in grid power, even if the inverter output voltage, current, and phase initially do not significantly change. Additionally, the use of a out-of-phase signal to vary the phase relationship between the grid voltage current waveform and the output current waveform does not significantly affect harmonic distortion at the inverter output during normal operation of the inverter.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 2:
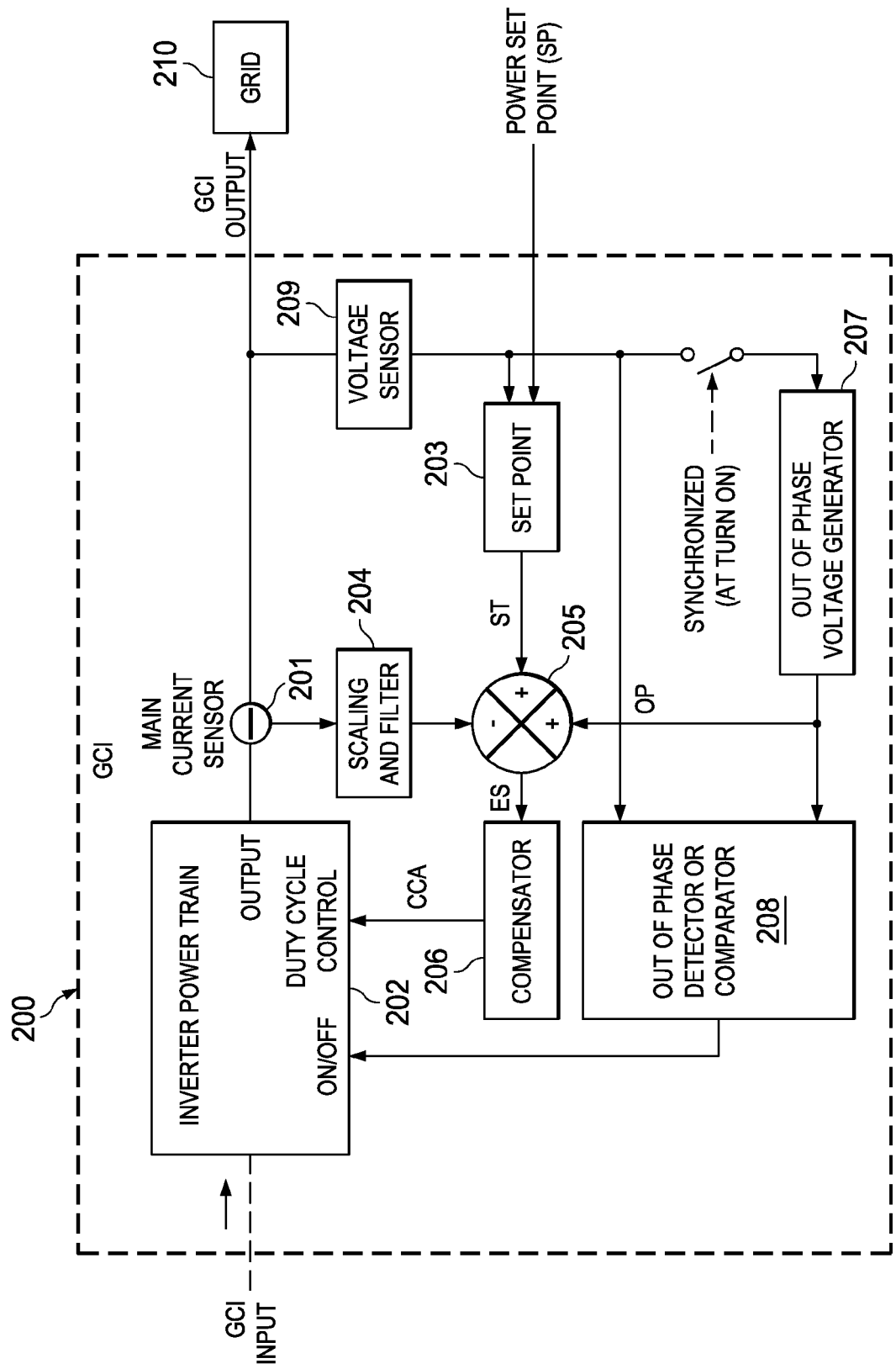
FIG. 2 is a functional block diagram of exemplary GCI with anti-islanding (grid-disconnect) functionality according to one embodiment of the principles of the present invention and suitable for use in the systems shown in FIGS. 1A and 1B.
Figure 3:
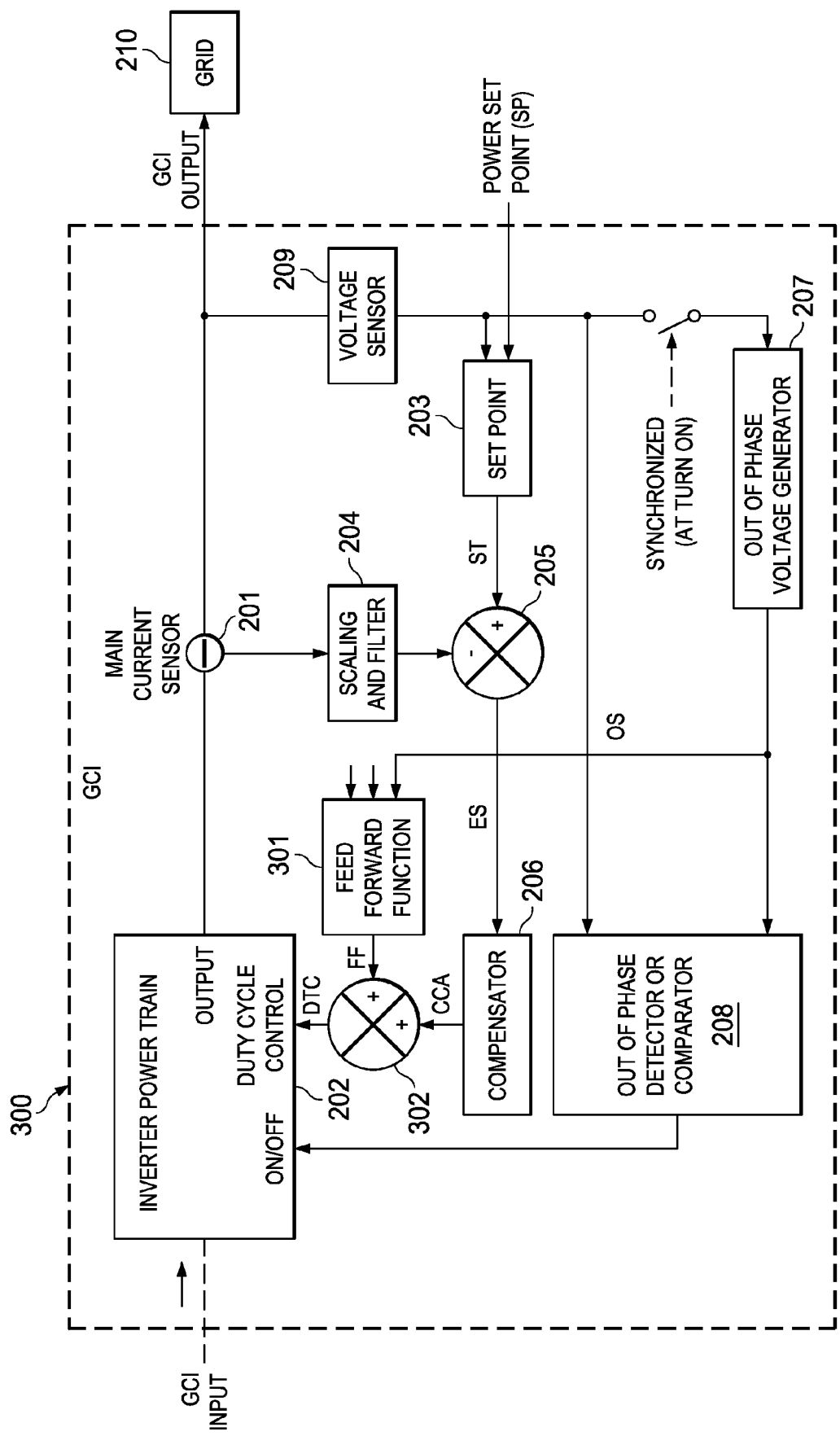
FIG. 3 is a functional block diagram of exemplary GCI with anti-islanding (grid-disconnect) functionality according to another embodiment of the principles of the present invention and suitable for use in the systems shown in FIGS. 1A and 1B.

The principles of the present invention and their advantages are best understood by referring to the illustrated embodiment depicted in FIGS. 2-3 of the drawings, in which like numbers designate like parts.

Figure 1A:
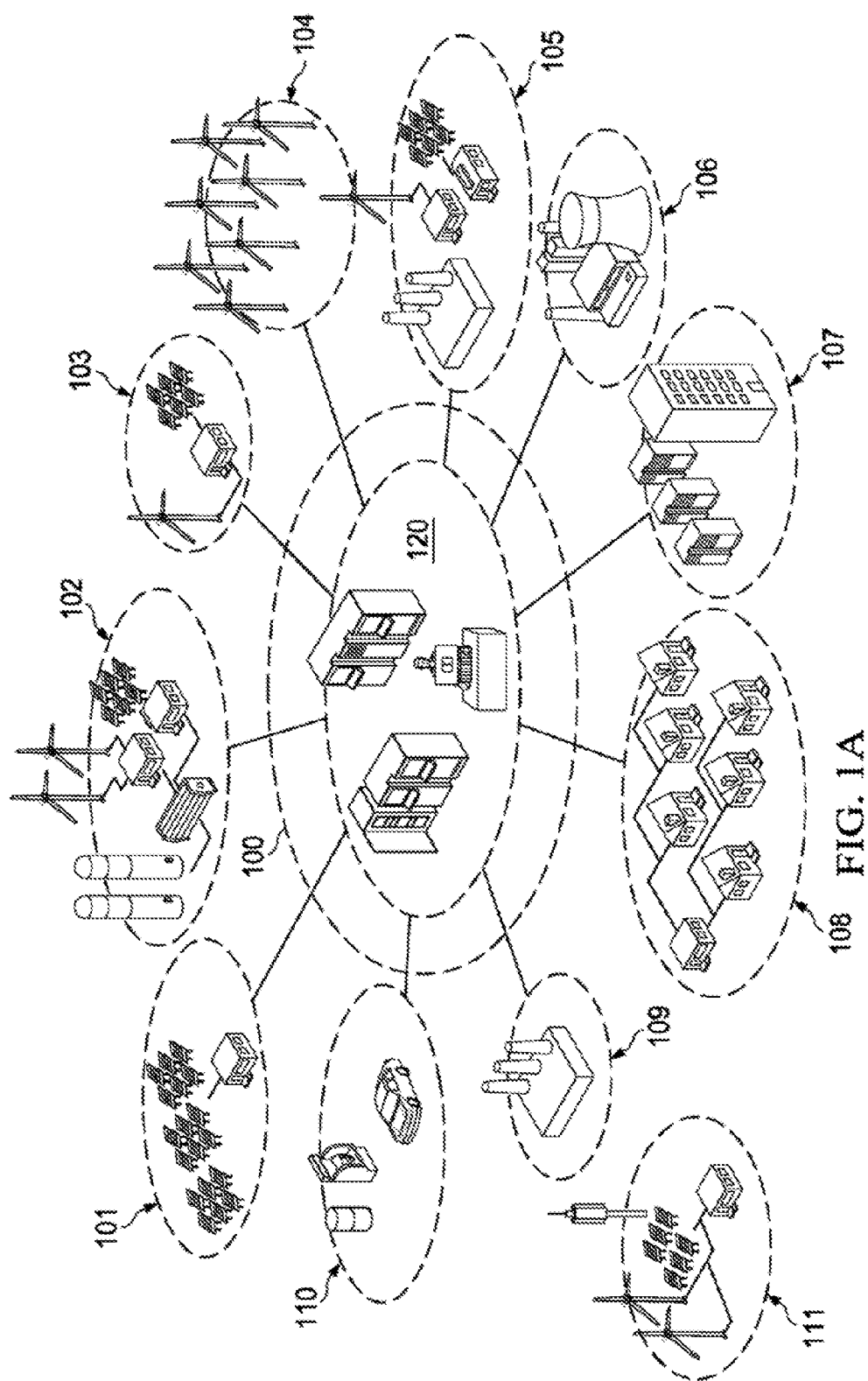
FIG. 1A is a conceptual drawing of a power generation and distribution system including a number of typical electrical power sources, which are either directly or indirectly connected to a power grid through converters or processes suitable for application of the principles of the present invention.
Figure 1B:
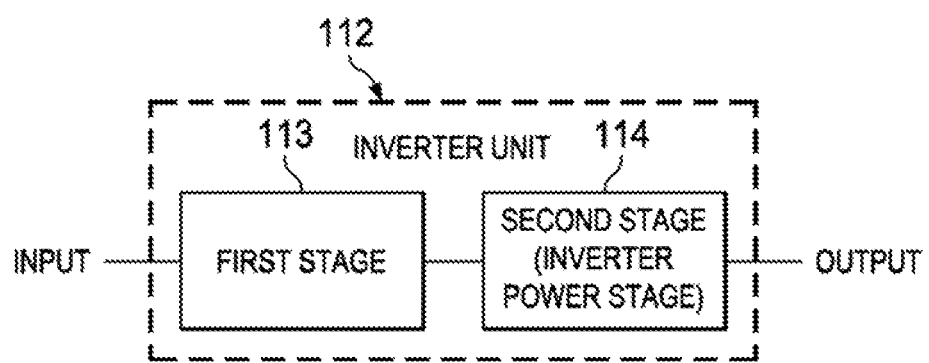
FIG. 1B is a high-level functional block diagram of a two-stage inverter unit suitable for generally describing the technical field in which the principles of the present invention may be applied.

FIG. 2 is a block diagram of an exemplary Grid Connected Inverter (GCI) 200 with anti-islanding (grid-disconnect) functionality according to one embodiment of the present inventive principles. GCI 200 can advantageously be applied to the systems and subsystems shown in FIG. 1A, including inverters, uninterrupted power supply (UPS) systems, and AC/DC converters, among others.

Generally, the power train current is compared with an reference current ST, which is an image of the requested current that the inverter power train must deliver to the grid, as shaped by the waveform of the grid voltage. Reference current ST is generated from the power set point input signal SP, which is a constant value, dimensioned in watts or kilowatts. For the case where the GCI output voltage and the GCI output current are in-phase, the power set point signal SP represents the active (real) power. For the case where the GCI output voltage and the GCI output current are out-of-phase, the power set point signal SP represents the apparent power, which includes both active (real) and reactive (imaginary) components. In a three-phase system, SP represents the total power being provided by the GCI to the grid, with each phase of the power output from GCI 200 presumed to provide one-third (⅓) of the total GCI output power. Hence, for a three-phase system, the value of SP input into the system is divided by three (3) to produce the specific value of SP applied to each phase.

In the illustrated embodiment of GCI 200, the power set point input signal SP is obtained by scaling the active power (AP) requested using conventional scaling circuitry (not shown). The SP input signal is then used by Set Point block 203 to generate reference current ST, which again is an image of the requested output current shaped by the grid voltage waveform. Specifically, for a given phase X, Set Point block 203 generates reference ST by scaling the grid voltage $V_{PhaseX}$, multiplying the scaled grid voltage by SP, and dividing the resulting product by root-mean-square (RMS) value of the grid voltage:

$$ST = \frac{SP \times V_{PhaseX}}{V_{RMS}^2}$$

where: SP is the scaled requested active power AP;
$V_{PhaseX}$ is the grid voltage for Phase X; and
$V^2_{RMS}$ is the square of the root-mean-squared value of the grid voltage.

Generally, in the current control loop, reference current ST is compared in Combiner 205 with the instantaneous GCI output current value measured by Main Current Sensor 201 (after scaling and filtering in Scaling and Filtering block 204) to generate an error signal (ES). Error signal ES is processed with a Compensator 206 to generate a corrective control action (CCA) signal. For Compensator 206, a PID (Proportional Integral Derivative) function, a two poles—two zeros function (second order section), or another known function may be used. The CCA signal varies the duty cycle of inverter power train 202, which varies the phase relationship between the output current waveform and the grid voltage waveform. In the illustrated embodiment, the grid voltage is measured by a Voltage Sensor 209.

In an inverter used for solar power application, a Maximum Power Point Tracking (MPPT) algorithm may be used, which allows the maximum power to be directly used to calculate the set point SP.

Delaying or advancing the phase of reference current waveform ST in Set Point Block 203 can vary the amount of reactive power RP delivered to the grid. If the grid voltage and the current are out-of-phase, GCI 200 inverter must process more power to deliver the reactive power RP, which is advantageous in solar inverter and UPS applications when the load is inductive or capacitive. A capacitor bank, which it typically connected to the grid for power factor correction, is no longer needed when the ability to vary the phase of the reference current waveform is included. If a Power Factor Correction (PFC) unit with similar functionality can be qualified as "a resistor emulator", then a GCI embodying the present principles can be qualified as a "negative resistor emulator" because it delivers power in contrast to a PFC unit, which absorbs power.

One major advantage realized by the embodiments of the present principles is the ability to automatically track the grid voltage shape and deliver only active power AP to the grid, which maximizes the efficiency of GCI 200. Even if the grid voltage is not a pure sine wave, the GCI output current will have the same waveform. Therefore, at any time, the grid voltage and current are proportional, which is not the case with Space Vector Modulation Control, which assumes the voltage is a sinusoidal waveform.

According to the principles of present invention, GCI also includes a voltage control loop. In the embodiment of GCI 200 shown in FIG. 2, an Out-of-Phase Voltage Generator block 207 is synchronized to the grid voltage waveform provided for by Voltage Sensor 209 for the given power phase. In particular, Out-of-Phase Voltage Generator block 207 generates an out-of-phase signal OP that is synchronized with the grid voltage waveform, but out-of-phase, typically by 90 degrees (i.e., in quadrature). Out-of-Phase Voltage Generator 207 can be implemented using a fast Phase Locked Loop (PLL) or, in the case of three-phase power, by mathematically combining the voltage waveforms of the three phases to generate a close estimate of the quadrature version of each phase.

Out-of-phase signal OP is added to the reference current waveform ST in the current control loop of the CGI 200 and compared to the image of the output current to generate error signal ES. During normal operations, when the grid is at the grid voltage, the phase difference introduced by out-of-phase signal OS into error signal ES is very small relative to the contribution of the result compare with reference current ST. For example, the out-of-phase signal OS may change the phase of reference current ST by only about 1% relative to the phase of the output current. In the illustrated embodiment, the out-of-phase signal OS is combined in the current control loop by Combiner 205 with reference current ST the scaled and filtered GCI output current from Scaling and Filtering Block 204 to generate error signal ES. Error signal ES is processed by Compensator 206 to generate the CCA signal that shapes the GCI output current waveform to be slightly out-of-phase with the grid voltage waveform.

In the particular embodiment of the GCI 200 shown in FIG. 2, space vector modulation control is used, for example, such that the error signal ES directly controls inverter power train 202 through Compensator 206 and the CCA signal.

So long as the grid power is on, the power set point input to GCI 200 remains a non-zero constant and the ES and CCA signals produce an output current waveform that is only slightly out-of-phase with the grid voltage waveform, which minimizes the loss of power. At the same time, the GCI output current waveform is in-phase with the out-of-phase signal OS from Out-of-phase Voltage Generator 207. An Out-of-Phase Detector/Comparator 208 compares the GCI output voltage waveform, which is locked to the grid voltage waveform provided by Voltage Sensor 209, with the out-of-phase signal OS. Out-of-Phase Detector/Comparator 208 in turn generates a control signal to maintain inverter power train 202 on and generating the output current waveform while the GCI output voltage waveform and the out-of-phase signal OS remain in-phase.

On an unannounced interruption of the grid voltage, the power set point SP input to GCI 200 remains unchanged, and GCI 200 must detect the loss of grid condition and safely shut down. Initially, GCI 200 continues to output current, with the de-energized grid now presenting an increased impedance at the GCI output. The out-of-phase signal OS continues to be generated by the Out-of-Phase Voltage Generator 207. However, without the low impedance of the grid, the GCI output voltage is now primarily determined by the combination in Combiner 205 of the mirrored output current from Scaling and Filtering current block 204 and the out-of-phase signal OS generated by Out-of-Phase Generator 207. The CCA signal then causes the GCI output current and voltage waveforms to be out-of-phase with out-of-phase signal OS. Out-of-Phase Detector/Comparator 208 detects the out-of-phase condition between the output voltage waveform and the out-of-phase signal OS and turns-off Inverter Power Train 202.

In other words, GCI 200 shown in FIG. 2 includes an output current control loop (i.e., the normal power output loop) and a voltage control loop (i.e., anti-islanding loop). Both loops generate control values that are combined to control Inverter Power Train 202 via Duty Cycle Control. The current loop, which includes Set Point block 203, Combiner 205, and Compensator 206, primarily uses the current measured by Current Sensor 201, along with the power set point signal SP and the reference current waveform ST. The current loop attempts to create an output current waveform that is phase aligned with the grid voltage waveform. The voltage loop, which includes Out-of-Phase Voltage Generator 207 and Combiner 205, uses the voltage from Voltage Sensor 209 exclusively. The voltage loop attempts to create an output current waveform that is out-of-phase, typically by 90 degrees, with the GCI output/grid voltage.

As long as the low impedance grid is connected, the gain of the voltage loop is too low to have an effect on the output/grid voltage, so GCI 200 is controlled with the control signals dominated by the current control loop. More specifically, the input into Combiner 205 from Out-of-Phase Voltage Generator 207 is only large enough to produce a very small difference in phase between the grid voltage waveform and the GCI output current waveform, as discussed above.

When the grid is disconnected, the impedance at the output of the GCI 200 jumps by a factor of 10 or more. This impedance jump increases the gain in the voltage loop causing the output voltage waveform to change, typically slewing in phase and frequency as the effect of the out-of-phase signal OS emerges. In particular, the increase in grid impedance is detected as a frequency (phase) change in the GCI output voltage. In response, the gain of the output into Combiner 205 from Out-of-Phase Voltage Generator 207 increases such that the phase difference between the GCI output voltage waveform and the voltage output from Out-of-Phase Voltage Generator 207 increases. The resulting difference between the GCI output voltage waveform and the voltage output from Out-of-Phase Voltage Generator 207 is detected and Inverter Power Train 202 is turned off. For example the Open Loop and Close Loop transfer functions of the voltage loop only:

$$OL = C \times P \times Z_{Load}/(Z_{Out}+Z_{Load}) = V_{Out}/In$$

$$CL = OL/(1+S \times OL)$$

where: OL is the open loop transfer function (TF).
C is the transfer function of Compensator 206.
P is the transfer function of the Inverter Power Train 202 PWM controlled switches.
$Z_{Out}$ is the output impedance of Inverter Power Train 202.
$Z_{Load}$ is the load impedance (i.e., the grid impedance).
$Z_{Load} \ll Z_{Out}$ when the grid is connected.
Typically $Z_{Load} > Z_{Out}$ when the grid is disconnected.
$V_{Out}$ is the output voltage of GCI 200.
In is the input control signal (Power Set Point) SP.
CL is the closed loop transfer function.
S is the transfer function of the voltage sensor.

In an alternate embodiment of the system shown in FIG. 2, islanding is detected by observing changes in loop stability, depending on whether GCI 200 is connected to an energized or de-energized grid. In this case, when grid 210 is energized, the load impedance seen by GCI 200 is low, but when grid 210 is de-energized or disconnected, the load impedance seen by GCI 200 can be more than ten times higher in a properly installed GCI. By tuning the loop including Out-of-Phase Voltage Generator 207, Combiner 205 generating the error signal ES, and Compensator 206 generating the signal CCA, an unstable condition is created when the load impedance increases on a power disruption (e.g., disconnection from the grid, grid de-energized). The unstable condition is detected at the GCI output as an islanding condition and Inverter Power Train 202 turned off. The unstable condition is detected, for example, by observing the GCI output with Voltage Sensor 209 for either aunder-voltage or over-voltage condition, an under-frequency or over-frequency condition, the occurrence of an under-zero-crossing-period or over-zero-crossing-period, or an over-current condition.

The grid voltage and the input voltage are sensed such that, depending on the topology of the actual embodiment, the theoretical operating point Duty Cycle (DTC) of the inverter can be calculated. GCI 300 shown in FIG. 3 utilizes a feed-forward (FF) function implemented in Feed-Forward Function block 301. The input and output voltage values for GCI 300 are used by the FF function to compute the theoretical (nominal) DC operating point. The CCA signal is added in Combiner 302 to this nominal DC operating point to set the actual DC operating point for inverter power train 202. In this case, Compensator 206 generates a CCA signal that compensates only for small errors compared to the nominal DC operating value, for example, those errors due to temperature drift and differences in components.

As an example, a three-level PWM inverter power train generating a three-phase output will be assumed for describing one possible FF function, although the following discussion can be extended to single-phase inverter trains, as well as inverter power trains using a different number of levels. A complete derivation of the following equations can be fund in application Ser. No. 14/141,175, incorporated herein by reference.

In this example, the theoretical operating point for the positive half-cycle of one selected output phase PhaseX is:

$$DutyCycle_X = \frac{V_{PhaseX} - V_{Middle}}{V_{Plus} - V_{Middle}}$$

where: $V_{phaseX}$ is the output voltage for PhaseX
PWM inverter stages switch between the voltages $V_{Plus}$ and $V_{Middle}$
DutyCycleX=0 to 1

$V_{middle}$ is selected either by:

Min.–Max. Shape:

$$V_{Middle} = \frac{\text{Maximum}(V_{PhaseX}) - \text{Minimum}(V_{PhaseX})}{2};$$

or

Third Harmonic Shape:

$$V(\text{Middle}) = \frac{\prod_X V_{PhaseX}}{[\text{Maximum}(V_{PhaseX})]^2}$$

The determination of the output voltage for the negative half-cycle for the phase is the same, except that the PWM inverter stages switch between $V_{Middle}$ and $V_{Minus}$. For purposes of calculation, the output voltage for the negative half-cycle can be translated to the positive half-cycle by taking the product of the difference $V_{Plus}-V_{Middle}$ and the inverse of duty cycle, i.e., DutyCycleX=−1 to 0.

In GCI 300, the anti-islanding detection function is embedded in the Feed Forward Function block 301, which can also generate the out-of-phase signal OS internally in alternate embodiments. Depending on the FF function equation selected, the out-of-phase signal OS is added to one or more voltage and/or current inputs used by the FF function. The detection of an islanding condition is the same a described above with regards to the embodiment of FIG. 2, with Out-of-Phase Detector/Comparator 208 turning off inverter power train 202 when Out-of-Phase signal and the output current waveform go out-of-phase or other grid controlled parameters depart from their normal ranges.

The technique described above is applicable to both single-phase and multiple-phase systems. For multiple-phase systems, each phase is controlled with a dedicated control loop and set point function, as described above. In a state-of-the-art embodiment of the present principles, if vector control is implemented, all phases in a multiple-phase system are controlled with a single control loop and the result of the loop (i.e., the CCA signal) distributed according to phase, for example, using a DQ transform, also known as Park's transform, originally described in the AIEE paper "*Two-Reaction Theory of Synchronous Machines Generalized Method of Analysis*" by R. H. Park in 1929.

In the preferred embodiments shown in FIGS. 2 and 3, the processing operations (blocks) operations (e.g., Set Point block 203, Combiner 205, Filters and Scaler block 204, Compensator 205, Out-of-Phase Voltage Generator 207, Out-of-Phase Detector/Comparator 208, Feed-Forward Function block 301) are implemented in the digital domain with a digital signal processor (DSP). In alternate embodiments, these operations (blocks) can be implemented, either in whole or in part, in the analog domain using commercially available power factor correction integrated circuits. In the figures, the conventional support circuitry such as analog-to-digital converters (ADCs), scaling circuitry, and dividers are not shown for clarity.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method of detecting an interruption of grid electrical power on an electrical grid coupled to an output of an inverter power train, comprising:

generating a reference current waveform based on an image of a power train output current waveform shaped by a grid voltage waveform using circuitry comprising part of a current control loop;

generating a power train control signal in response to a difference between the reference current waveform and the power train output current waveform using circuitry comprising part of the current control loop;

generating an out-of-phase control signal synchronized and out-of-phase with the grid voltage waveform using a voltage control loop coupled to an output of the inverter power train, the voltage control loop having a gain proportional to an inverter power train load impedance;

combining the reference current waveform and the out-of-phase control signal using the current control loop to vary the power train control signal and produce a small phase difference between the power train output current waveform and the grid voltage waveform;

detecting using a detector an increase in the inverter power train load impedance; and generating a control signal for turning-off the inverter power train in response to detecting the increase in the inverter power train load impedance resulting from the interruption in the grid electrical power.

2. The method of claim 1, wherein:

the step of detecting using the detector the increase in the inverter power train load impedance comprises detecting an increase in phase difference between the out-of-phase control signal and a power train output voltage waveform; and the step of turning off the inverter power train comprises turning-off the inverter power train in response to the increase in phase difference between the power train output voltage waveform and the out-of-phase control signal caused by the increase in the inverter load power train impedance resulting from the interruption in the grid electrical power.

3. The method of claim 1, wherein:

the voltage control loop is tuned to become unstable in response to the increase in the inverter load power train impedance resulting from the interruption in grid electrical power;

the detecting step comprises detecting the increase in the inverter power train load impedance by detecting a change in power train output voltage waveform caused by instability of the voltage control loop; and the step of turning-off the inverter power train comprises turning-off the inverter power train in response to the change in the power train output voltage waveform caused by the instability of the voltage control loop.

4. The method of claim 3, wherein the step of detecting the change in the power train output voltage waveform comprise detecting the change in the power train output voltage waveform selected from the group consisting of:
   an under-voltage condition;
   an over-voltage condition;
   an under-frequency condition;
   an over-frequency condition;
   an under-zero-crossing-period;
   an over-zero-crossing-period; and
   an over-current condition.

5. The method of claim 1, wherein the step of combining the reference current waveform and the out-of-phase control signal comprises:
   combining using a combiner the image of the power train output current waveform with the reference current waveform and the out-of-phase control signal to generate an error signal;
   performing using a compensator a corrective control action using the error signal to generate the power train control signal.

6. The method of claim 1, wherein the inverter power train is controlled with space vector modulation and the power train control signal directly controls a duty cycle control terminal of the inverter power train.

7. The method of claim 1, wherein the out-of-phase control signal generated by the voltage control loop is produced using a phase-locked-loop.

8. The method of claim 1, wherein the inverter power train outputs multiple-phase power and the voltage control loop comprises an out-of-phase voltage generator for generating the out-of-phase control signal from a quadrature waveform estimated by combining voltage waveforms of output power phases.

9. The method of claim 1, wherein the step of generating the out-of-phase control signal comprises synchronizing the out-of-phase control signal with the grid voltage waveform at turn-on of the inverter power train.

10. Anti-islanding control circuitry for controlling an inverter power train providing power to an electrical grid comprising:
   a current control loop including circuitry for generating a reference current waveform based on an image of a power train output current waveform shaped by a grid voltage waveform; and circuitry for generating a power train control signal in response to a difference between the reference current waveform and the power train output current waveform;
   a voltage control loop having a gain proportional to an inverter power train load impedance for generating an out-of-phase control signal synchronized and out-of-phase with the grid voltage waveform, wherein the out-of-phase control signal is combined with the reference current waveform using the current control loop to vary the power train control signal and produce a small phase difference between the power train output current waveform and the grid voltage waveform; and
   a detector for detecting an increase in the inverter power train load impedance resulting from an interruption in the grid voltage waveform, and in response generate a control signal for turning-off the inverter power train.

11. The anti-islanding control circuitry of claim 10, wherein the detector detects the increase in the inverter power train load impedance by detecting an increase in phase difference between the out-of-phase control signal and a power train output voltage waveform.

12. The anti-islanding control circuitry of claim 10, wherein the voltage control loop is tuned to become unstable in response to an increase in the inverter power train load impedance resulting from an interruption in grid electrical power; and the detector detects the increase in the inverter power train load impedance by detecting a change in a power train output voltage waveform caused by instability of the voltage control loop.

13. The anti-islanding control circuitry of claim 12, the detector is operable to detect changes in the power train output voltage waveform selected from the group consisting of:
   an under-voltage condition;
   an over-voltage condition;
   an under-frequency condition;
   an over-frequency condition;
   an under-zero-crossing-period;
   an over-zero-crossing-period; and
   an over-current condition.

14. The anti-islanding control circuitry of claim 10, wherein the current control loop comprises:
   a combiner for combining the image of the power train output current waveform with the reference current waveform and the out-of-phase control signal to generate an error signal; and
   a compensator for performing a corrective control action using the error signal to generate the power train control signal.

15. The anti-islanding control circuitry of claim 10, wherein the inverter power train is controlled with space vector modulation and the power train control signal directly controls a duty cycle control terminal of the inverter power train.

16. The anti-islanding control circuitry of claim 10, wherein the voltage control loop comprises a phase-locked loop for generating the out-of-phase control signal.

17. The anti-islanding control circuitry of claim 10, wherein the inverter power train outputs multiple-phase power and the voltage control loop comprises an out-of-phase voltage generator for generating the out-of-phase control signal from a quadrature waveform estimated by combining voltage waveforms of output power phases.

18. The anti-islanding control circuitry of claim 10, wherein the voltage control loop is operable to synchronize the out-of-phase control signal with the grid voltage waveform at turn-on of the inverter power train.

19. The anti-islanding control circuitry of claim 10, wherein at least a portion of the current control loop is implemented with a digital signal processor.

20. The anti-islanding control circuitry of claim 10, wherein at least a portion of the voltage control loop is implemented with a digital signal processor.

21. The anti-islanding control circuitry of claim 10, wherein at least a portion of the current control loop is implemented with an analog integrated circuit.

22. The anti-islanding control circuitry of claim 10, wherein at least a portion of the voltage control loop is implemented with an analog integrated circuit.

* * * * *